Patented May 2, 1933

1,907,219

UNITED STATES PATENT OFFICE

WILLIAM W. SIEG, OF BELLEFONTE, PENNSYLVANIA

HIGH STRENGTH HOT WORKING COPPER NICKEL ZINC ALLOY

No Drawing.   Application filed November 11, 1931. Serial No. 574,463.

The present invention relates to an improved metal alloy and has for its primary object to provide a composition consisting of a number of main constituents so proportioned and homogeneously commingled or mixed either alone or preferably with other ingredients such as deoxiders, and/or materials imparting ductility to the mixture, whereby a machinable metal alloy of a physical strength comparable to the alloy steels is inexpensively produced from which freely machineable forgings, die pressings and die castings can be commercially made.

A further object of the invention is to produce a high tensile alloy capable of being worked commercially within standard tolerances to a highly desirable degree at comparatively low temperatures in the manufacture of such articles as plumbing, refrigerating fittings and other parts and articles of manufacture by the various sand casting, drop-forging, die pressing and die casting processes commonly practiced in manufacturing such articles.

A still further object is to provide a high tensile alloy with the desirable corrosion-resisting properties of the nickel-copper alloys which will readily permit polishing and buffing of any articles of manufacture made therefrom to a high comparatively light lustre.

With the above and other objects in view as will become apparent as the description proceeds, the invention consists in the combination of the several ingredients hereinafter specified, mixed in substantially the proportions set forth.

The main ingredients of my improved alloy are copper, nickel, and zinc, to which other minor ingredients may be added where desirable as follows:

|  | Per cent |
|---|---|
| Copper | 49.5 to 54.5 |
| Nickel | 1.0 to 6 |
| Lead | 0.5 to 2.5 |
| Aluminum | 0.01 to 1.5 |
| Manganese | 0.01 to 2.5 |
| Zinc | Remainder. |

The alloy is prepared by placing the constituents in a pot in which they are melted and thoroughly mixed. The melting pot may be inserted in any desirable type of furnace where the contents are subjected to melting temperatures of 1700 to 1800° F.

The resulting thoroughly mixed, melted alloy is then conveyed to holding furnaces, heated by gas, oil, coal, coke or electricity to temperatures ranging from 1450 to 1550° F., which of course are substantially lower than those employed in melting the ingredients. The metal in these furnaces is in semi-molten state and may be used for die-casting processes by ladling charges into die casting machines where such charges are formed into finished products. Where a forging method of manufacture is to be practiced, the liquid alloy from the melting pots is cast into billets which are heated to temperatures ranging from 1300 to 1500° F., and formed into rods or bars by extrusion, rolling, or hammering.

The rods thus formed are then cut into suitable lengths and again heated to temperatures between 1300 and 1500° F. in furnaces and finally placed between dies, on presses of the hammer, crank, screw, or any well known type. The dies are then brought together resulting in the formation of forgings of the desired shape, which after removal from the press are finished off by the usual machining and polishing operations.

The several reheating and cooling steps and the final hot working step at approximately the same temperatures reached in the reheating operations, have been found to greatly add to the homogeneousness of the finished product.

The present alloy has a tensile strength of 85,000 to 100,000 lbs. per square inch and makes an exceptionally good welding rod, where only copper, nickel, and zinc are used in the following percentages:

|  | Per cent |
|---|---|
| Copper | 51 |
| Nickel | 5 |
| Zinc | Remainder. |

Tests have proven that where steel posts are welded together with the foregoing alloy, the weld will have a tensile strength of 45,000 to 55,000 lbs. per square inch, with elongations of 12% per two inches.

The use of a non-corrosive, machinable and polishable metal alloy in the manufacture of the articles referred to herein, eliminates the necessity of expensive plating steps heretofore employed, for forgings and castings of copper alloys. It is well known, that while the commonly known copper nickel-zinc alloys can, to a certain degree, be worked by hot forging methods they require high temperatures and furthermore are not commercially forgible within standard tolerances and also are not forgible to that homogeneous degree of fineness required in the practical manufacture of the articles contemplated herein.

The desirability of a high tensile metal alloy capable of being commercially forged, hot pressed or die cast, dependent upon the facilities available, has long been recognized. Such an alloy has also long been sought, due to the fact that a superior finished product can be made by these methods, that is, superior in physical properties, superior in finish due to the absence of sand, blow holes, etc., and much more uniform in desired shape, in short, a finished product which requires as minimum of labor and expense to finish as distinguished from one made for example, by the sand casting method. The employment of comparatively low temperatures is also most desirable in order to reduce the presence of scale in the finished product to a minimum. Furthermore, the low temperature methods add greatly to the life of dies by substantially reducing the building up of material on these dies and permit of the same percentage of work being accomplished with much lower pressures. As previously stated, high tensile copper nickel-zinc alloys have not been forgible to practical degrees of tolerances, safety and efficiency and where forging has been attempted it was deemed necessary to employ relatively high temperatures.

I have demonstrated that an alloy consisting of nickel, copper and zinc as the main ingredients, wherein the copper is from about 49.5% to 54.5% (51% preferred); the nickel is from about 1.0% to 6% (preferably about 1%); and the remainder zinc possesses hot working properties to a very high degree, that is, hot workable by hot extruding, hot pressing, forging, die-casting, etc. Articles such as rods, adaptable for screw machine operations, bath room fixtures, automobile hardware, locks, bolts, nuts, ship hardware and the like made from this alloy by the forged, hot pressed, or die cast methods have proven to be of exceptional physical properties and finish. Extruding can also be efficiently carried out with an alloy of this content, but in such or kindred operations, a small percentage of aluminum, say from 0.1% to 1.0% is preferably added to the alloy, to increase the plasticity. Likewise (in die casting operations), lead from 0.5% to 2.5% has been found to increase the machinability and is therefore preferably added to the mixture, although it apparently does not enhance the hot working properties. A small amount of manganese, from about 0.01% to 2.5% when added to the mixture, lends toughness and also increases the hot working properties, while the addition of from 0.01% to 1.5% of silicon gives a degree of plasticity and hardness in the mixture and therefore is preferably employed.

Actual practice has proven that an alloy containing the main ingredients hereinbefore mentioned, and in substantially the proportions given, with or without the addition of the desirable minor materials specified, can be commercially hot worked to an extremely high degree of efficiency at the comparatively low temperatures of 1300 to 1500° F. The ultimate manufactured product takes a brilliant lustre when polished and is corrosive-resistant to a high degree.

What I claim is:

A readily machinable, corrosion-resisting, polishable copper-zinc white-metal alloy of a tensile strength of 85,000 to 100,000 lbs. per square inch, and having the property of being commercially hot-workable by forging, die casting and die pressing methods at relatively low temperatures, substantially between 1300° to 1500° F., the said alloy comprising the following ingredients combined substantially in the proportions stated, to wit; copper, 49.5% to 55.5%, nickel 1.0% to 6.0%, aluminum, .01% to 1%, lead, .5% to 2.5%, silicon .01% to 1.5%, manganese, .01% to 2.5%, and zinc (remainder), approximately 47%.

In testimony whereof I affix my signature.

WM. W. SIEG.